US011160052B2

(12) United States Patent
Fu et al.

(10) Patent No.: US 11,160,052 B2
(45) Date of Patent: Oct. 26, 2021

(54) METHOD FOR ADJUSTING BROADCAST RECEIVER QUEUE, STORAGE MEDIUM AND ELECTRONIC DEVICE (71) Applicant: Guangdong OPPO Mobile Telecommunications Corp., Ltd., Guangdong (CN)

(72) Inventors: Liangjing Fu, Guangdong (CN); Runsheng Pei, Guangdong (CN); Zhiyong Lin, Guangdong (CN); Ruyu Wu, Guangdong (CN); Jun Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 141 days.

(21) Appl. No.: 16/565,431

(22) Filed: Sep. 9, 2019

(65) Prior Publication Data
US 2020/0008175 A1 Jan. 2, 2020

Related U.S. Application Data (63) Continuation of application No. PCT/CN2017/106944, filed on Oct. 19, 2017.

(30) Foreign Application Priority Data

Mar. 10, 2017 (CN) .......................... 201710141454.4

(51) Int. Cl.
*H04W 72/00* (2009.01)
*H04W 72/10* (2009.01)
(Continued)

(52) U.S. Cl.
CPC ..... *H04W 72/005* (2013.01); *H04M 1/72403* (2021.01); *H04M 1/72484* (2021.01); *H04W 72/10* (2013.01); *H04H 60/90* (2013.01)

(58) Field of Classification Search
CPC ......... H04M 1/72522; H04M 1/72403; H04M 1/72484; G06F 9/546; G06F 9/3855;
(Continued)

(56) References Cited

U.S. PATENT DOCUMENTS 5,652,833 A * 7/1997 Takizawa ............ G06F 11/2028
714/10
6,058,389 A 5/2000 Chandra et al.
(Continued)

FOREIGN PATENT DOCUMENTS

CN 1798360 A 7/2006
CN 101296130 A 10/2008
(Continued)

OTHER PUBLICATIONS

International search report for PCT/CN2017/106944, dated Dec. 27, 2017.
(Continued)

*Primary Examiner* — Jackie Zuniga Abad
*Assistant Examiner* — Sun Jong Kim
(74) *Attorney, Agent, or Firm* — Young Basile Hanlon & MacFarlane, P.C.

(57) ABSTRACT

Provided are a method for adjusting a broadcast receiver queue, an apparatus, a storage medium, and an electronic device. The method may include: acquiring a historical parameter of a broadcast receiver; determining whether the historical parameter meets a first predefined condition; when the historical parameter of a first target broadcast receiver in a first broadcast receiver queue meets the first predefined condition, generating a second broadcast receiver queue; and moving the first target broadcast receiver to the second broadcast receiver queue, such that broadcast receivers other than the first target broadcast receiver in the first broadcast receiver queue and the first broadcast receiver in the second
(Continued)

broadcast receiver queue may process the broadcast messages in parallel.

13 Claims, 6 Drawing Sheets

(51) Int. Cl.
*H04M 1/72403* (2021.01)
*H04M 1/72484* (2021.01)
*H04H 60/90* (2008.01)

(58) Field of Classification Search
CPC .... G06F 9/542; G06F 9/5038; G06F 11/0757; G06F 2009/4557; H04L 65/4076; H04L 65/601; H04L 43/16; H04W 72/005; H04W 72/102; H04W 72/10; H04W 28/08
See application file for complete search history.

(56) References Cited

U.S. PATENT DOCUMENTS

| | | | |
|---|---|---|---|
| 2003/0226056 A1* | 12/2003 | Yip | G06F 11/0757 714/4.1 |
| 2004/0044846 A1* | 3/2004 | Matthews | G06F 3/0689 711/113 |
| 2006/0034394 A1* | 2/2006 | Popescu | H04L 7/033 375/326 |
| 2006/0218560 A1 | 9/2006 | Dadiomov et al. | |
| 2009/0320044 A1 | 12/2009 | Dar et al. | |
| 2013/0290513 A1* | 10/2013 | Shikari | H04L 43/08 709/224 |
| 2014/0089259 A1* | 3/2014 | Cheng | G06F 3/0659 707/612 |
| 2015/0100963 A1* | 4/2015 | Govindarajeswaran | G06F 9/4881 718/102 |
| 2015/0169363 A1* | 6/2015 | Anderson | G06F 9/4893 718/103 |
| 2016/0323170 A1 | 11/2016 | Hu et al. | |

FOREIGN PATENT DOCUMENTS

| | | |
|---|---|---|
| CN | 103888619 A | 6/2014 |
| CN | 106936827 A | 7/2017 |
| WO | 2008003536 A2 | 1/2008 |

OTHER PUBLICATIONS

English translation of First Office Action in a counterpart Chinese Patent application No. 201710141454.4, dated Mar. 13, 2018.
European search report, EP17899903, dated Nov. 11, 2019 (7 pages).
Indian Examination Report for IN Application 201917039871 dated Jan. 20, 2021. (5 pages).

* cited by examiner

METHOD FOR ADJUSTING BROADCAST RECEIVER QUEUE, STORAGE MEDIUM AND ELECTRONIC DEVICE

CROSS-REFERENCE TO RELATED APPLICATION(S)

The present application is a continuation of International (PCT) Patent Application No. PCT/CN2017/106944, which claims foreign priority of Chinese Patent Application No. 201710141454.4, filed on Mar. 10, 2017, the entire contents of both of which are hereby incorporated by reference in their entireties.

TECHNICAL FIELD

The present disclosure relates to the field of terminals, and in particular to a method for adjusting broadcast receiver queue, an apparatus, a storage medium, and an electronic device.

BACKGROUND

In Android system, broadcast is a mechanism that is widely used for message transmission among applications. The broadcast in Android may monitor events of the system or the applications.

In Android system, some applications may self-start or execute other operations by receiving various broadcast messages. When some of the applications receive the broadcast messages, they may execute some time-consuming operations or the applications themselves may have lags, resulting in the broadcast messages not being processed in time or even processed out of time. Therefore, subsequent distribution of the broadcast messages may be impacted, increasing power consumption of the system and reducing stability of the system.

SUMMARY

An aspect of the present disclosure is to provide a method for adjusting a broadcast receiver queue, which may include: acquiring a historical parameter of any broadcast receiver, wherein the broadcast receiver is arranged in a first broadcast receiver queue; determining whether the historical parameter meets a first predefined condition; generating a second broadcast receiver queue, when the historical parameter of a first target broadcast receiver in the first broadcast receiver queue meets the first predefined condition; and moving the first target broadcast receiver to the second broadcast receiver queue, such that other broadcast receivers rather than the first target broadcast receiver in the first target broadcast receiver queue and the first target broadcast receiver in the second broadcast receiver queue process broadcast messages in parallel, and the second broadcast queue consists of only broadcast receivers, which are initially arranged in the first broadcast queue, and each has the historical parameter meeting the first predefined condition.

Another aspect of the present disclosure is to provide a storage medium, for storing a plurality of instructions which are able to be executed by a processor, causing the processor to perform a method to adjust a broadcast receiver queue. The method may include: acquiring a historical parameter of any broadcast receiver, wherein the broadcast receiver is arranged in a first broadcast receiver queue; determining whether the historical parameter meets a first predefined condition; generating a second broadcast receiver queue when the historical parameter of a first target broadcast receiver in the first broadcast receiver queue meets the first predefined condition; and moving the first target broadcast receiver to the second broadcast receiver queue, such that other broadcast receivers rather than the first target broadcast receiver in the first broadcast receiver queue and the first target broadcast receiver in the second broadcast receiver queue process broadcast messages in parallel, and the second broadcast queue consists of only broadcast receivers, which are initially arranged in the first broadcast queue, and each has the historical parameter meeting the first predefined condition.

Still another aspect of the present disclosure may provide an electronic device, including a processor and a non-transitory memory, wherein the non-transitory memory may store a plurality of instructions and the instructions stored in the non-transitory memory may be loaded by the processor to acquire a historical parameter of any broadcast receiver, wherein the broadcast receiver is arranged in a first broadcast receiver queue; determine whether the historical parameter meets a first predefined condition; generate a second broadcast receiver queue, when the historical parameter of a first target broadcast receiver in the first broadcast receiver queue meets the first predefined condition; and move the first target broadcast receiver to the second broadcast receiver queue, such that other broadcast receivers rather than the first target broadcast receiver in the first broadcast receiver queue and the first target broadcast receiver in the second broadcast receiver queue process broadcast messages in parallel, and the second broadcast queue consists of only broadcast receivers, which are initially arranged in the first broadcast queue, and each has the historical parameter meeting the first predefined condition.

BRIEF DESCRIPTION OF DRAWINGS

By reading detailed description of the following appended figures about non-restrictive embodiments, other features, aims, and advantages of the present disclosure may become more apparent.

DETAILED DESCRIPTION

The present disclosure is to be described in details in accordance with the appended figures and embodiments. It should be understood that the embodiments described in details are for the purposes of explaining the present disclosure only, but not to limit the present disclosure. Further-more, to be noted that, for a convenient description, the figures illustrate a part but not all contents that are related to the present disclosure.

Current broadcast schemes are lack of management mechanisms on broadcast receivers (applications), for example, some applications in a broadcast receiver queue may execute some time-consuming operations, or the applications themselves may have lags, resulting in received broadcast messages not being processed in time, impacting subsequent distribution of the broadcast messages, increasing power consumption of the system, and reducing stability of the system.

An aspect of the present disclosure is to provide a method for adjusting a broadcast receiver queue, which may include: acquiring a historical parameter of any broadcast receiver, wherein the broadcast receiver is arranged in a first broadcast receiver queue; determining whether the historical parameter meets a first predefined condition; generating a second broadcast receiver queue, when the historical parameter of a first target broadcast receiver in the first broadcast receiver queue meets the first predefined condition; and moving the first target broadcast receiver to the second broadcast receiver queue, such that other broadcast receivers rather than the first target broadcast receiver in the first target broadcast receiver queue and the first target broadcast receiver in the second broadcast receiver queue process broadcast messages in parallel, and the second broadcast queue consists of only broadcast receivers, which are initially arranged in the first broadcast queue, and each has the historical parameter meeting the first predefined condition.

In an embodiment, the historical parameters may include a number of historical timeouts for processing broadcast messages.

Determining whether the historical parameters meet the first predefined condition may include determining whether the number of historical timeouts for processing broadcast messages reaches a first set threshold value.

The generating the second broadcast receiver queue, when the historical parameter of the first target broadcast receiver in the first broadcast receiver queue meets the first predefined condition may include generating the second broadcast receiver queue, when the number of historical timeouts for the first target broadcast receiver in the first broadcast receiver queue to process broadcast messages reaches the first set threshold value.

In an embodiment, when time that the broadcast receiver consumes to process broadcast messages is greater than a set fixed time threshold value, the number of historical timeouts may increase by one.

when the time that the broadcast receiver consumes to process the broadcast message is greater than a first dynamic time threshold value, the number of historical timeouts increases by one, wherein the dynamic time threshold value is determined based on an initially set value, the number of the historical timeouts, and a time increasing amplitude; and the time increasing amplitude is an increased amount of the dynamic time threshold value for each increase of the number of timeouts over a predetermined number.

In an embodiment, the historical parameters may include a second dynamic time threshold value, which is used to determine whether the broadcast message is time-out processed.

Determining whether the historical parameters meet the first predefined condition may include determining whether the dynamic time threshold value, which is used to determine whether broadcast message is time-out processed, is greater than a second set threshold value for the first time.

Generating the second broadcast receiver queue, when the historical parameters of a first target broadcast receiver in a first broadcast receiver queue meet the first predefined condition, may include generating the second broadcast receiver queue, when the corresponding dynamic time threshold value of the first target broadcast receiver in the first broadcast receiver queue is greater than the second set threshold value for the first time.

Therein the dynamic time threshold value is determined based on the number of the historical timeouts, a time increasing amplitude, and an initially set value; the initially set value is smaller than the second set threshold value; and the second set threshold value is a fixed value.

In an embodiment, the method may further include setting the first target broadcast receiver to be a second target broadcast receiver, which is an endangered application, when the historical parameter of the first target broadcast receiver further meets a second predefined condition; and prohibiting from distributing the broadcast messages to the second target broadcast receiver.

The historical parameter comprises a number of historical timeouts for processing broadcast messages, historical time consumed to process the broadcast messages, a sum of duration of historical timeouts for processing the broadcast messages, or a dynamic time threshold value for determining whether the broadcast messages is time-out processed; and the dynamic time threshold value is determined according to the number of historical timeouts, a time-increasing amplitude, and an initially set value.

In an embodiment, the historical parameters may include a number of historical timeouts for processing broadcast messages, and the method may further include: acquiring a sum of duration of historical timeouts for the broadcast receiver to process the broadcast messages; and adjusting a sequence of broadcast receivers, which have a same number of historical timeouts, based on the sum of duration of historical timeouts thereof.

In an embodiment, the method may further include, when more than one first target broadcast receivers being available, and receiving a target broadcast message, detecting in sequence whether each of the first target broadcast receivers completes processing the target broadcast message within a third set threshold value; and, when a present first target broadcast receiver is detected as not completing processing the target broadcast message within the third set threshold value, distributing the target broadcast message to a next first target broadcast receiver, and labeling the next target broadcast receiver as the present first target broadcast receiver.

Another aspect of the present disclosure is to provide a storage medium, for storing a plurality of instructions which are able to be executed by a processor, causing the processor to perform a method to adjust a broadcast receiver queue. The method may include: acquiring a historical parameter of any broadcast receiver, wherein the broadcast receiver is arranged in a first broadcast receiver queue; determining whether the historical parameter meets a first predefined condition; generating a second broadcast receiver queue when the historical parameter of a first target broadcast receiver in the first broadcast receiver queue meets the first predefined condition; and moving the first target broadcast receiver to the second broadcast receiver queue, such that other broadcast receivers rather than the first target broadcast receiver in the first broadcast receiver queue and the first target broadcast receiver in the second broadcast receiver queue process broadcast messages in parallel, and the second broadcast queue consists of only broadcast receivers, which are initially arranged in the first broadcast queue, and each has the historical parameter meeting the first predefined condition.

In an embodiment, the historical parameter may include a number of historical timeouts for processing broadcast messages. Then the determining whether the historical parameter meets the first predefined condition may include determining whether the number of historical timeouts for processing broadcast messages reaches a first set threshold value; and the generating the second broadcast receiver queue when the historical parameter of the first target broadcast receiver in the first broadcast receiver queue meets the first predefined condition may include generating the second broadcast receiver queue when the number of historical timeouts for the first target broadcast receiver in the first broadcast receiver queue to process broadcast messages reaches the first set threshold value.

In an embodiment, when the historical parameter of the first broadcast receiver further meets a second predefined condition, the instructions may be executed to set the first target broadcast receiver to be a second target broadcast receiver, which is an endangered application and prohibit from distributing the broadcast messages to the second target broadcast receiver. Therein, the historical parameter comprises a number of historical timeouts for processing broadcast messages, historical time consumed to process the broadcast messages, a sum of duration of historical timeouts for processing the broadcast messages, or a dynamic time threshold value for determining whether broadcast messages are time-out processed; and the dynamic time threshold value is determined according to the number of historical timeouts, a time-increasing amplitude, and an initially set value.

In an embodiment, the historical parameter may include a number of historical timeouts for processing the broadcast messages, and a sum of duration of historical timeouts for the broadcast receiver to process the broadcast messages; and the instructions may be executed to adjust a sequence of broadcast receivers, which may have a same number of historical timeouts, based on the sum of duration of historical timeouts thereof.

In an embodiment, the instructions may be further executed to sequence the broadcast receivers that have the same number of timeouts based on the sum of duration of historical timeouts from the smallest to the greatest, such that the broadcast receiver, which has a smaller sum of duration of timeout, may process a next broadcast messages first.

In an embodiment, when more than one first target broadcast receivers being available, and receiving a target broadcast message, the instructions may be executed to detect in sequence whether each of the first target broadcast receivers completes processing the target broadcast message within a third set threshold value; and when a present first target broadcast receiver is detected as not completing processing the target broadcast message within the third set threshold value, the instructions may be executed to distribute the target broadcast message to a next first target broadcast receiver, and labeling the next first target broadcast receiver as the present first target broadcast receiver.

Still another aspect of the present disclosure is to provide an electronic device, which may include a processor and a non-transitory memory, wherein the non-transitory memory stores a plurality of instructions and the instructions stored in the non-transitory memory are loaded by the processor to acquire a historical parameter of any broadcast receiver, wherein the broadcast receiver is arranged in a first broadcast receiver queue; to determine whether the historical parameter meets a first predefined condition; to generate a second broadcast receiver queue, when the historical parameter of a first target broadcast receiver in the first broadcast receiver queue meets the first predefined condition; and to move the first target broadcast receiver to the second broadcast receiver queue, such that other broadcast receivers rather than the first target broadcast receiver in the first broadcast receiver queue and the first target broadcast receiver in the second broadcast receiver queue process broadcast messages in parallel, and the second broadcast queue consists of only broadcast receivers, which are initially arranged in the first broadcast queue, and each has the historical parameter meeting the first predefined condition.

In an embodiment, the historical parameter may include a number of historical timeouts for processing broadcast messages. When determining whether the historical parameter meets the first predefined condition, the processor may be further arranged to determine whether the number of historical timeouts for processing broadcast messages reaches a first set threshold value. When the historical parameter of the first target broadcast receiver in the first broadcast receiver queue meets the first predefined condition, and the second broadcast receiver queue being generated, the processor may be arranged to generate the second broadcast receiver queue when the number of historical timeouts for the first target broadcast receiver in the first broadcast receiver queue to process broadcast messages reaches the first set value.

In an embodiment, when time that the broadcast receiver consumes to process the broadcast messages is greater than a set fixed time threshold value, the number of historical timeouts may be increased by one. Alternatively, when the time that the broadcast receiver consumes to process the broadcast messages is greater than a dynamic time threshold value, the number of historical timeouts may be increased by one, wherein the dynamic time threshold value may be determined based on an initially set value, the number of the historical timeouts, and a time increasing amplitude; and the time increasing amplitude may be an increased amount of the dynamic time threshold value for each increase of the number of timeouts over a predetermined number.

In an embodiment, the historical parameter may include a second dynamic time threshold value used to determine whether the broadcast message is time-out processed. When determining whether the historical parameter meets the first predefined condition, the processor may be arranged to determine whether the dynamic time threshold value, which is used to determine whether the broadcast message is time-out processed, is greater than a second set threshold value for the first time. Also, when the historical parameter of the first target broadcast receiver in the first broadcast receiver queue meets the first predefined condition, and the second broadcast receiver queue is generated, the processor may be arranged to generate the second broadcast receiver queue when the corresponding dynamic time threshold value of the first target broadcast receiver in the first broadcast receiver queue is greater than the second threshold value for the first time. Therein, the dynamic time threshold value may be determined based on the number of the historical timeouts, a time increasing amplitude, and an initially set value, the initially set value may be smaller than the second set threshold value, and the second set threshold value is a fixed value.

In an embodiment, the processor may be further arranged to set the first target broadcast receiver to be a second target broadcast receiver, which may be an endangered application, when the historical parameter of the first target broadcast receiver further meets a second predefined condition; and prohibit from distributing the broadcast messages to the second target broadcast receiver. Therein, the historical parameter may include a number of historical timeouts for processing broadcast messages, historical time consumed to process the broadcast messages, a sum of duration of timeouts for processing the broadcast messages, or a dynamic time threshold value used to determine whether broadcast messages are time-out processed; and the dynamic time threshold value may be determined according to the number of historical timeouts, a time increasing amplitude, and an initially set value.

In an embodiment, the historical parameter may include a number of historical timeouts for processing the broadcast messages, and the processor may be further arranged to acquire a sum of duration of historical timeouts for the broadcast receiver to process the broadcast messages; and adjust a sequence of broadcast receivers, which have a same number of historical timeouts, according to the sum of duration of historical timeouts thereof.

In an embodiment, the processor may be further arranged to detect in sequence whether each of the first target broadcast receivers completes processing a target broadcast message within a third set threshold value when more than one of the first target broadcast receivers being available, and receiving the target broadcast message; and, when a present first target broadcast receivers is detected as not completing processing the target broadcast message within the third set threshold value, distribute the target broadcast message to a next first target broadcast receiver and label the next first target broadcast receiver as the present first target broadcast receiver.

Figure 1A:
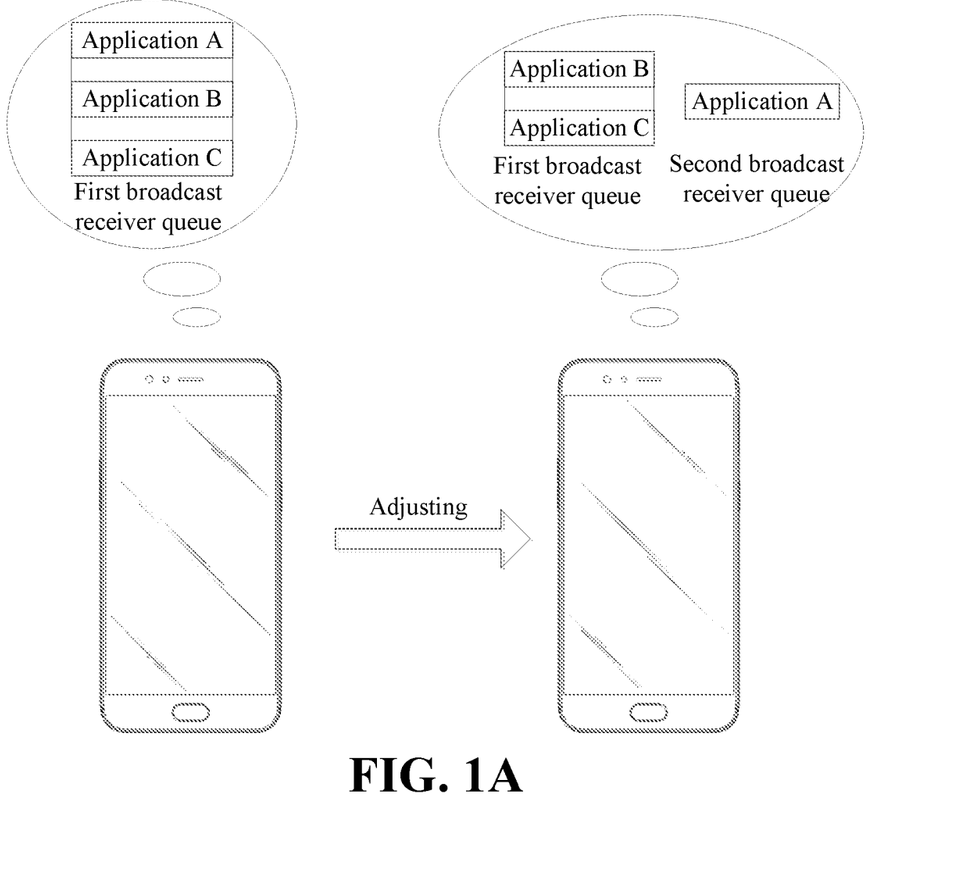
FIG. 1A is a scenario graph illustrating a method for adjusting a broadcast receiver queue provided by an embodiment of the present disclosure.

As an example of an electronic device that has an integrated apparatus for adjusting a broadcast receiver queue, a specific application scenario of a method for adjusting the broadcast receiver queue is shown in FIG. 1A. For example, a first broadcast receiver queue of the electronic device may include an application A, an application B and an application C, a historical parameter of each application may be acquired. It may be determined whether the historical parameter of each application meets a first predefined condition. When an application can meet the first predefined condition, a second broadcast receiver queue may be generated, and the application, which meets the first predefined condition, may be moved to the second broadcast receiver queue. In such a way, the second broadcast receiver queue may consist of only the broadcast receivers, which are originally arranged in the first broadcast queue and meet the first predefined condition. For example, the application A in the first broadcast receiver queue may meet the first predefined condition, then the application A may be moved to the second broadcast receiver queue, so that the rest of the applications in the first broadcast receiver queue (the application B and C) and the application that has been moved to the second broadcast receiver queue (the application A) may process broadcast messages in parallel.

The technical solutions provided by the present embodiment may move the first target broadcast receiver, which has the historical parameter meeting the first predefined condition, from the first broadcast receiver queue to the second broadcast receiver queue, such that broadcast receivers other than the first target broadcast receiver in the first broadcast receiver queue and the first target broadcast receiver in the second broadcast receiver queue may process broadcast messages in parallel, improving speed of processing the broadcast, reducing the number of timeouts, and stabilizing the system.

Figure 1B:
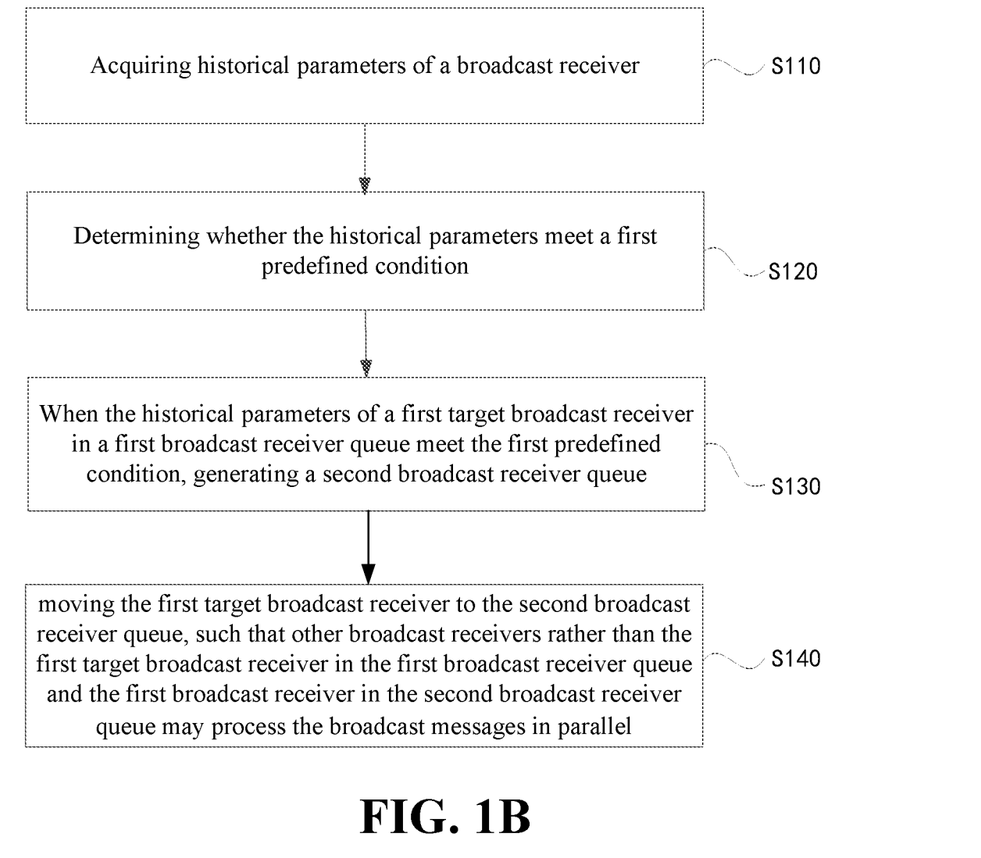
FIG. 1B is a flow chart illustrating a method for adjusting a broadcast receiver queue provided by an embodiment of the present disclosure.

In a referred embodiment, a method for adjusting a broadcast receiver queue is provided. The method may be executed by a broadcast receiver queue adjusting apparatus as shown in FIG. 1B. Technical solutions provided by the present embodiment may include following operations.

S110: a historical parameter of any broadcast receiver may be acquired, wherein the broadcast receiver is arranged in a first broadcast receiver queue.

While processing broadcast, service process of a broadcast sender may invoke a broadcast sending function (such as the sendBroadcast function) to send a broadcast message to a broadcast management module (such as ActivityManagerService). The broadcast management module may place the received broadcast message into a broadcast sending queue. The broadcast management module may then send the broadcast messages in the broadcast sending queue to a broadcast receiver that meets receiving conditions through a process communication mechanism (such as the process communication mechanism of Binder).

In the broadcast mechanism, the broadcast message refers to a message that is transmitted between a system and/or an application, during operation of the system or the application. To be exemplary, the broadcast message may be a broadcast message about starting the system, a broadcast message in a form of texts, a broadcast message in a form of phone calls, a broadcast message of a third-party application or the like.

In the present embodiment, for those broadcast receivers which register for a same broadcast message, when the broadcast message is distributed, the broadcast receivers may be sequenced in a queue and process the broadcast message in a sequential manner. At this stage, the broadcast receivers, which register for the same broadcast message, are arranged in a first broadcast receiver queue.

In the present embodiment, the historical parameter of the broadcast receivers may include a number of historical timeouts for processing the broadcast messages, historical time consumed for processing the broadcast messages, a sum of duration of the historical timeouts for processing the broadcast messages or a dynamic time threshold value for determining whether the broadcast message is time-out processed. Also, the historical parameter of the broadcast receivers is not limited to the above mentioned parameters.

The number of historical timeouts for a broadcast receiver to process a broadcast message may be the number of historical timeouts for the broadcast receiver to process the broadcast message within a predefined period of time.

Historical time of the broadcast receiver to process the broadcast message may be historical time of the broadcast receiver to process the broadcast message within the predefined period of time or historical time of the broadcast receiver to process the broadcast message within a predefined number of times. The broadcast receiver may process a plurality of broadcast messages within the predefined period of time, therefore, the historical time of the broadcast receiver to process the broadcast message within the predefined period of time may be of plural. That is, processing of each broadcast message may correspond to a period of processing time. The predefined number of times may be of once or a plurality of times. When the predefined number of times is equal to one, the historical time of the broadcast receiver to process the broadcast message may be the time that most lately the broadcast receiver consumed to process the broadcast message.

The time of historical timeouts may be the time that exceeds a predefined value when the broadcast receiver processes the broadcast message within a predefined period of time or within a predefined number of times. The predefined value may be fixed or variable in accordance with changes of the number of timeouts. The sum of the time of the historical timeouts is obtained by adding the time that exceeds the set value from each time.

The dynamic time threshold value for determining whether the broadcast message is time-out processed may refer to, when time that a broadcast receiver consumes to process a broadcast message is greater than the dynamic time threshold value, determining the broadcast receiver processing the broadcast message times out. The dynamic time threshold value is determined based on an initially set value, a number of historical timeouts, and time increasing amplitude. The time increasing amplitude may be an increased amount of the dynamic time threshold value for each increase of the number of timeouts over a predetermined number.

S120: it may be determined whether the historical parameter meets the first predefined condition.

The first predefined condition may be that the number of timeouts reaches a set threshold value; or historical mean time, which is calculated based on the time consumed for processing broadcast messages, reaches the first set threshold value; or historical time that consumed to process the latest broadcast message reaches the second set time threshold value; or the sum of the duration of the historical timeouts for processing broadcast messages reaches the third set time threshold value; or the dynamic time threshold value, which is used to determine whether the broadcast message is time-out processed, is greater than a set threshold value for the first time, and the dynamic time threshold value is initially set to be smaller than the set threshold value. The first predefined condition is not limited to the above-mentioned forms, but may also in other forms.

S130: when the historical parameter of the first target broadcast receiver in the first broadcast receiver queue meets the first predefined condition, a second broadcast receiver queue may be generated.

In the present embodiment, each broadcast message may correspond to a broadcast receiver queue, the broadcast receivers in the first broadcast receiver queue may register at least one same broadcast messages.

In the present embodiment, when a broadcast message is received, and when the historical parameter of the first target broadcast receiver in the first broadcast receiver queue meets the first predefined condition, the second broadcast receiver queue may be generated; or when the broadcast message is not received, and when the historical parameter of the first target broadcast receiver in the first broadcast receiver queue meets the first predefined condition, the second broadcast receiver queue may also be generated.

When the historical parameter includes the time consumed to process broadcast messages, and when the time that the first target broadcast receiver consumed to process the latest broadcast message is greater than the second set time threshold value, the second broadcast receiver queue may be generated. Alternatively, when historical mean time that the first broadcast receiver consumed to process broadcast messages is greater than the first set time threshold value, the second broadcast receiver queue may be generated; or when the sum of the duration of historical timeouts for the first target broadcast receiver to process broadcast messages reaches a third set time threshold value, the second broadcast receiver queue may be generated.

Conditions for determining whether the second broadcast receiver queue is to be generated may be in other forms. For example, the number of historical timeouts may meet the first predefined condition, or the dynamic time threshold value, which is used to determine whether the broadcast message is time-out processed, may meet the first predefined condition. Detailed implementations will be described in the following embodiments.

S140: the first target broadcast receiver may be moved to the second broadcast receiver queue, such that broadcast receivers other than the first target broadcast receiver in the first broadcast receiver queue and the first target broadcast receiver in the second broadcast receiver queue may process broadcast messages in parallel.

The broadcast receivers other than the first target broadcast receiver in the first broadcast receiver queue may be, after the first target broadcast receiver is moved, all the remaining broadcast receivers in the first broadcast receiver queue.

In the present embodiment, the first target broadcast receiver may be moved to the second broadcast receiver queue, such that the broadcast receivers other than the first target broadcast receiver in the first broadcast receiver queue may process broadcast messages, and the first target broadcast receiver may process broadcast messages while in the second broadcast receiver queue. It avoids the first target broadcast receiver from processing broadcast messages at a low speed and impacting other broadcast receivers in the queue to process broadcast messages, the speed of processing broadcast messages may be improved. In such a way, the second broadcast receiver queue may consist of the broadcast receivers, which are originally arranged in the first broadcast queue, the historical parameter of which meets the first predefined condition.

In the present embodiment, by moving the first target broadcast receiver, which has the historical parameter meeting the first predefined condition, from the first broadcast receiver queue to the second broadcast receiver queue, the broadcast receivers other than the first target broadcast receiver in the first broadcast receiver queue and the first target broadcast receiver in the second broadcast receiver queue may process broadcast messages in parallel. Speed of processing broadcast messages may be improved, the number of timeouts may be reduced, and the system may be stabilized.

On the basis of the above-mentioned embodiment, the method for adjusting a broadcast receiver queue may further include: when a historical parameter of a first target broadcast receiver meets a second predefined condition, the first target broadcast receiver may be set to be a second target broadcast receiver, which is an endangered application; broadcast messages may be prohibited to be distributed to the second target broadcast receiver. The historical parameter may include the number of historical timeouts for processing broadcast messages, historical time consumed to process broadcast messages, a sum of the duration of historical timeouts for processing broadcast messages, or a dynamic time threshold value for determining whether the broadcast message is time-out processed. The dynamic time threshold value is determined based on the number of historical timeouts, time increasing amplitude, and a dynamic time threshold value set initially.

To be specific, when the number of historical timeouts for any broadcast receiver in the second broadcast receiver queue to process broadcast messages reaches a first set threshold value, or historical time that any broadcast receiver in the second broadcast receiver queue consumes to process the broadcast messages reaches the first set time threshold value, or the sum of duration of the historical timeouts for any broadcast receiver in the second broadcast receiver queue to process broadcast messages reaches the second set time threshold value, or the dynamic time threshold value, which is used to determine whether the broadcast message is time-out processed, is greater than a set value, the broadcast receiver may be set to be an endangered application, and broadcast messages may be prohibited to be distributed to the endangered broadcast receiver.

Thus, by prohibiting distribution of broadcast messages to the endangered broadcast receiver, speed of processing broadcast messages may be improved, and when broadcast receivers, which have a lower processing speed, process broadcast messages, other broadcast message receivers may not be impacted.

Figure 2:
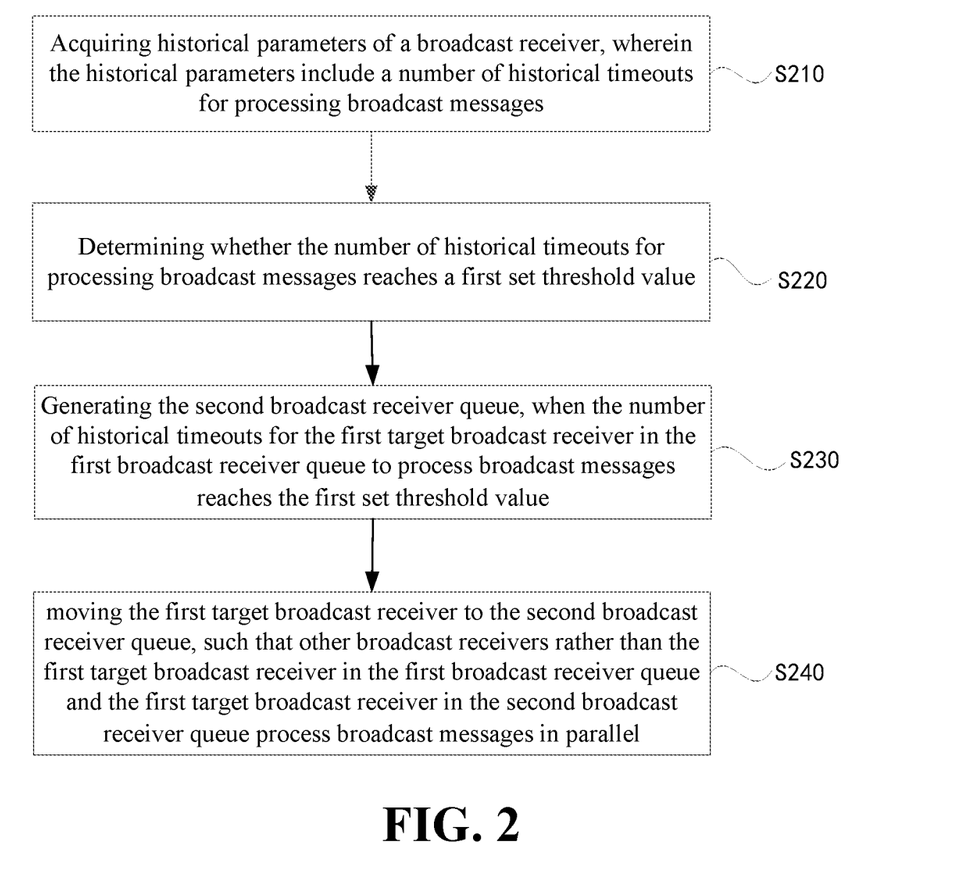
FIG. 2 is another flow chart illustrating a method for adjusting a broadcast receiver queue provided by an embodiment of the present disclosure.

In another embodiment, another method for adjusting a broadcast receiver queue may be provided and shown in FIG. 2. Technical solutions provided by the present embodiment may include following operations.

S210: a historical parameter of any broadcast receiver may be acquired, wherein the historical parameter may include a number of historical timeouts for processing broadcast messages.

S220: it may be determined whether the number of historical timeouts for processing broadcast messages reaches a first set threshold value.

In the present embodiment, the number of historical timeouts for processing broadcast messages may refer to a number of historical timeouts for processing broadcast messages before the instant processing. It may be the number of historical timeouts for the broadcast receiver to process broadcast messages within a predefined period of time, or a number of historical timeouts for the broadcast receiver to process broadcast messages under other condition.

In the present embodiment, when time that the broadcast receiver consumes to process the broadcast messages is greater than a set fixed time threshold value, the number of historical timeouts may increase by one. For example, the set fixed time threshold value may be 10 s, when the broadcast receiver spends more than 10 s processing a broadcast message, the number of timeouts of the broadcast receiver to process broadcast messages may increase by one.

Alternatively, when the time that the broadcast receiver consumes to process broadcast messages is greater than a dynamic time threshold value, the number of historical timeouts may increase by one. The dynamic time threshold value is determined based on an initially set value, the number of historical timeouts, and time increasing amplitude. The time increasing amplitude may be an increased amount of the dynamic time threshold value for each increase of the number of timeouts over a predetermined number.

In the present embodiment, a variable may be generated in a broadcast management module to flag the number of timeouts for the broadcast receiver to process broadcast messages and increasing amplitude of time adjustment. Based on the flagged number of timeouts, the number of historical timeouts for the broadcast receiver to process broadcast messages may be acquired.

For example, for each increase of the number of timeouts, the dynamic time threshold value may increase by is on the basis of a previous dynamic time threshold value that corresponds to processing a previous broadcast message. It may be expressed as an equation of $T=C \times T0+T1$, wherein $T1$ is the dynamic time threshold value set initially, C is the number of historical timeouts, $T0$ is time increasing amplitude, which is 1. When the dynamic time threshold value is initially set to be 10 s, and when the number of historical timeouts is 1, the dynamic time threshold value may be $1 \times 1+10=11$ s, which means 1 s is added to the initially set dynamic time threshold value to become 11 s. When the broadcast receiver spends less than 11 s processing another broadcast message, it may not be a timeout. When the broadcast receiver spends longer than 11 s processing another broadcast message, it may be a timeout, and the number of historical timeouts may increase by one. The time increase amplitude may also be, for every twice of the increase of the number of timeouts, adding 1 s to the previous dynamic time threshold value that corresponds to processing a previous broadcast message, or in other manners.

Also, the determination of the dynamic time threshold value based on the number of historical timeouts and the time increasing amplitude may properly control the number of timeouts for a broadcast receiver to process broadcast messages.

S230: when the number of timeouts for the first target broadcast receiver in the first broadcast receiver queue to process broadcast messages reaches the first set threshold value, the second broadcast receiver queue may be generated.

In the present embodiment, the first threshold value may be determined based on demands.

S240: the first target broadcast receiver may be moved to the second broadcast receiver queue, such that broadcast receivers other than the first target broadcast receiver in the first broadcast receiver queue and the first target broadcast receiver in the second broadcast receiver queue may process broadcast messages in parallel.

In the present embodiment, by moving the first target broadcast receiver, which has a number of historical timeouts exceeding the first set threshold value, from the first broadcast receiver queue to the second broadcast receiver queue, speed of processing broadcast messages and stability of the system may be improved.

On the basis of the above-mentioned embodiments, when the historical parameter includes the number of historical timeouts for processing broadcast messages, the method may further include: acquiring the sum of the duration of timeouts for processing broadcast messages; and, based on the sum of the duration of timeouts, adjusting a sequence of the broadcast receivers that have the same number of historical timeouts.

For example, within a predefined period of time, a broadcast receiver processing broadcast messages times out for 3 times, is for the first timeout, is for the second timeout, and 2 s for the third timeout. The sum of duration of timeout for the broadcast receiver to process broadcast messages may be adding the time duration of the three timeouts, which may be 4 s (1+1+2=4).

To be specific, within a predefined period of time or within a predefined number of times, broadcast receivers that have the same number of timeouts may be sequenced based on the sum of duration of historical timeouts from the smallest to the greatest, such that a broadcast receiver that has a smaller sum of duration of timeout may process broadcast messages first to improve speed of processing broadcast messages. For example, D and E are two broadcast receivers that are placed sequentially and have the same number of historical timeouts. The sum of duration of timeout for D may be 2 s, and the sum of duration of timeout for E may be 1 s, the order of D and E may be adjusted, such that E may process a next broadcast message before D.

Figure 3:
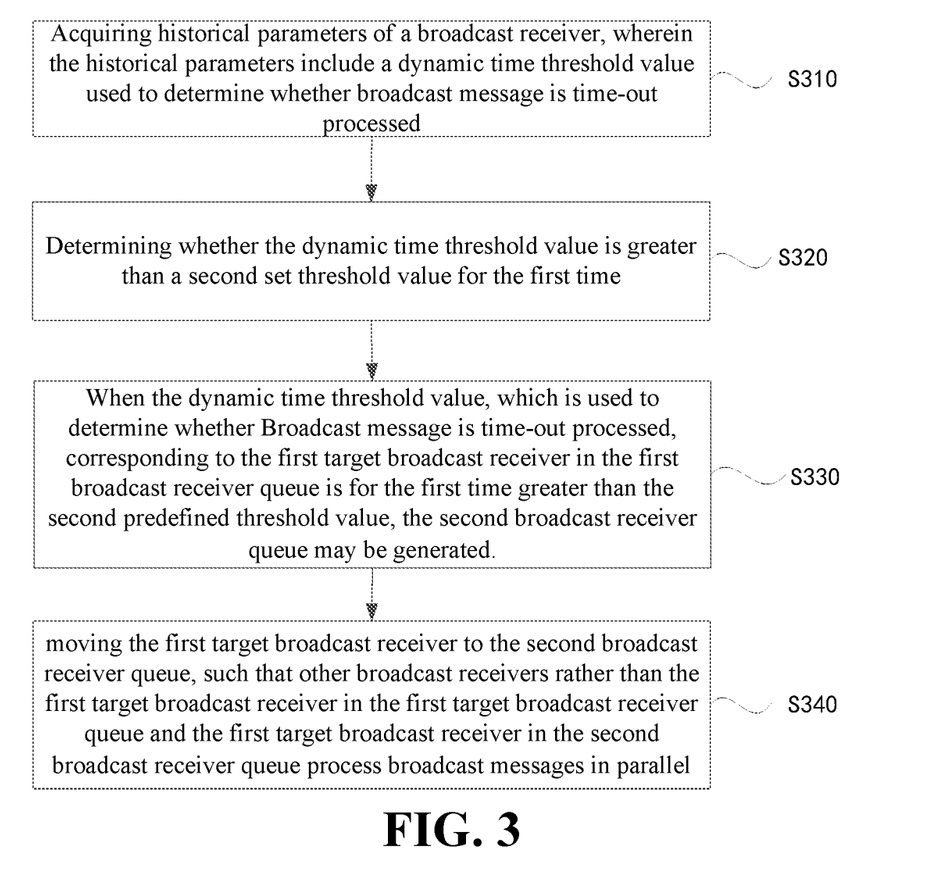
FIG. 3 is still another flow chart illustrating a method for adjusting a broadcast receiver queue provided by an embodiment of the present disclosure.

In another embodiment, still another method for adjusting the broadcast receiver queue may be provided and shown in FIG. 3. Technical solutions of the present embodiment may include following operations.

S310: a historical parameter of any broadcast receiver may be acquired, wherein the historical parameter may include a dynamic time threshold value for determining whether broadcast message is time-out processed.

In the present embodiment, the broadcast receiver may be initially arranged in a first broadcast receiver queue, and the dynamic time threshold value is determined based on the acquired number of historical timeouts, time increasing amplitude and the initially set dynamic time threshold value. The time increasing amplitude may be an increased amount of the dynamic time threshold value for each increase of the number of timeouts over a predetermined number.

S320: it may be determined whether the dynamic time threshold value is for the first time being greater than a second set threshold value.

In the present embodiment, the dynamic time threshold value may be set to smaller than the second set threshold value initially, wherein the second set threshold value may be a fixed value. As the dynamic time threshold value may be varied in accordance with changing of the number of historical timeouts, a situation of the dynamic time threshold value being greater than the second set threshold value may occur. For example, when the dynamic time threshold value is initially set to be 5 s, and the second set threshold value is 10 s, then for each increase in the number of timeout, the dynamic time threshold value may increase by 1 s. When the number of timeouts reaches 6, the dynamic time threshold value may be 11 s, which may be for the first time greater than the second set threshold value.

S330: when the dynamic time threshold value for determining whether the first target broadcast receiver in the first broadcast receiver queue is for the first time being greater than the second set threshold value, the second broadcast receiver queue may be generated.

In the present embodiment, the number of timeouts for the broadcast receiver to process broadcast messages may correspond to the dynamic time threshold value. Therefore, the change of the dynamic time threshold value may indicate the number of timeouts for processing broadcast messages. For example, when the number of timeouts for the first target broadcast receiver to process broadcast messages is 0, the corresponding dynamic time threshold value may be the initial set value. That is, when the dynamic time threshold value remains as the initially set value, it may be determined that the broadcast receiver processing broadcast messages never timed out.

S340: the first target broadcast receiver may be moved to the second broadcast receiver queue, so that broadcast receivers other than the first target broadcast receiver in the first broadcast receiver queue and the first target broadcast receiver in the second broadcast receiver queue may process broadcast messages in parallel.

In the present embodiment, by moving the first target broadcast receiver, which has a dynamic time threshold value being greater than the second set threshold value for the first time, from the first broadcast receiver queue to the second broadcast receiver queue. In such a way, the second broadcast receiver queue may consist of the broadcast receivers, which are initially arranged in the first broadcast queue, and the dynamic time threshold value of which may be for the first time being greater than the second set threshold value. Therefore, speed of processing broadcast messages may be improved, the number of timeouts may be reduced, and the system may be stabilized.

On the basis of the above-mentioned embodiments, the method may further include: when more than one first target broadcast receivers are in the second broadcast receiver queue, and when a target broadcast message is received, the more than one first target broadcast receivers may be detected in sequence whether each of the first target broadcast receivers may complete processing the target broadcast message within a third set threshold value. When a present first target broadcast receiver is detected as not completing processing the target broadcast message within a third set threshold value, the target broadcast message may be distributed to a next first target broadcast receiver.

To be specific, from the beginning of processing the target broadcast message, within the third set threshold value, if the broadcast management module does not receive a feedback message sent from the first target broadcast receiver indicating the processing has been completed, the first target broadcast receiver may be determined as not completing processing the target broadcast message within the third set threshold value. When the present first target broadcast receiver does not complete processing the target broadcast message, the target broadcast message may be distributed to a next first target broadcast receiver. For example, in the second broadcast receiver queue, first target broadcast receivers A, B, and C may be available in a sequential order, when B does not complete processing the target broadcast message within a third set threshold value, the target broadcast message may be distributed to C, such that C may process the target broadcast message.

Therefore, it may be avoided that a broadcast receiver at a lower speed may impact other broadcast receivers, and the speed of processing broadcast messages may be improved.

The present embodiment may further provide an apparatus for adjusting the broadcast receiver queue, which may include a first acquisition module, a determination module, a generating module and a moving module.

The first acquisition module may be used to acquire a historical parameter of any broadcast receiver, wherein the broadcast receiver is arranged in a first broadcast receiver queue.

The determination module may be used to determine whether the historical parameter meets a first predefined condition.

The generating module may be used to generate a second broadcast receiver queue, when the historical parameter of the first target broadcast receiver meets the first predefined condition.

The moving module may be used to move the first broadcast receiver to the second broadcast receiver queue, so that broadcast receivers rather than the first target broadcast receiver in the first broadcast receiver queue and the first target broadcast receiver in the second broadcast receiver queue may process broadcast messages in parallel. In such a way, the second broadcast receiver queue may consist of the broadcast receivers, which are initially arranged in the first broadcast receiver queue, and the historical parameter of which meet the first predefined condition.

In an embodiment, the historical parameter may include a number of historical timeouts for processing broadcast messages.

The determination module may be used to determine whether the number of historical timeouts for processing broadcast messages reaches a first set threshold value.

The generating module may be used to generate the second broadcast receiver queue, when the number of historical timeouts for the first target broadcast receiver in the first broadcast receiver queue to process broadcast messages reaches the first set threshold value.

In an embodiment, when time that the broadcast receiver consumes to process broadcast messages is greater than a set fixed time threshold value, the number of historical timeouts may increase by one.

Alternatively, when time that the broadcast receiver consumes to process broadcast messages is greater than a dynamic time threshold value, the number of historical timeouts may increase by one. The dynamic time threshold value may be determined based on an initially set value, the number of historical timeouts, and time increasing amplitude. The time increasing amplitude may be an increased amount of the dynamic time threshold value for each increase of the number of timeouts over a predetermined number.

In an embodiment, the historical parameter may include the dynamic time threshold value, which is used to determine whether broadcast message is time-out processed.

The determination module may be used to determine whether the dynamic time threshold value, which is used to determine whether broadcast message is time-out processed, is for the first time greater than the second set threshold value.

The generating module may be used to generate the second broadcast receiver queue, when the dynamic time threshold value, which is used to determine whether broadcast message is time-out processed, corresponding to a first target broadcast receiver in the first broadcast receiver queue is for the first time greater than the second set value.

The dynamic time threshold value may be determined based on the acquired number of historical timeouts, time increasing amplitude, and an initially set value. The initially set value is smaller than the second set threshold value, wherein the second set threshold value is fixed.

In an embodiment, the apparatus may further include following modules.

An endangered application setting module may be used to set a first target broadcast receiver as a second target broadcast receiver, which is an endangered application, when the historical parameter of the first target broadcast receiver meets a second predefined condition.

A distribution prohibiting module may be used to prohibit distributing a broadcast message to the second target broadcast receiver.

The historical parameter may include a number of historical timeouts for processing broadcast messages, historical time consumed for processing broadcast messages, a sum of the duration of timeouts for processing broadcast messages, or a dynamic time threshold value for determining whether broadcast message is time-out processed. The dynamic time threshold value is determined based on the number of historical timeouts, time increasing amplitude and an initially set value.

In an embodiment, the historical parameter including the number of historical timeouts may further include following blocks.

A second acquisition module may be used to acquire the sum of the duration of timeouts for a broadcast receiver to process broadcast messages.

An adjusting module may be used to adjust a sequence of the broadcast receivers, which have the same number of historical timeouts, based on the sum of the duration of timeouts.

In an embodiment, the apparatus may further include following operations.

Figure 4:
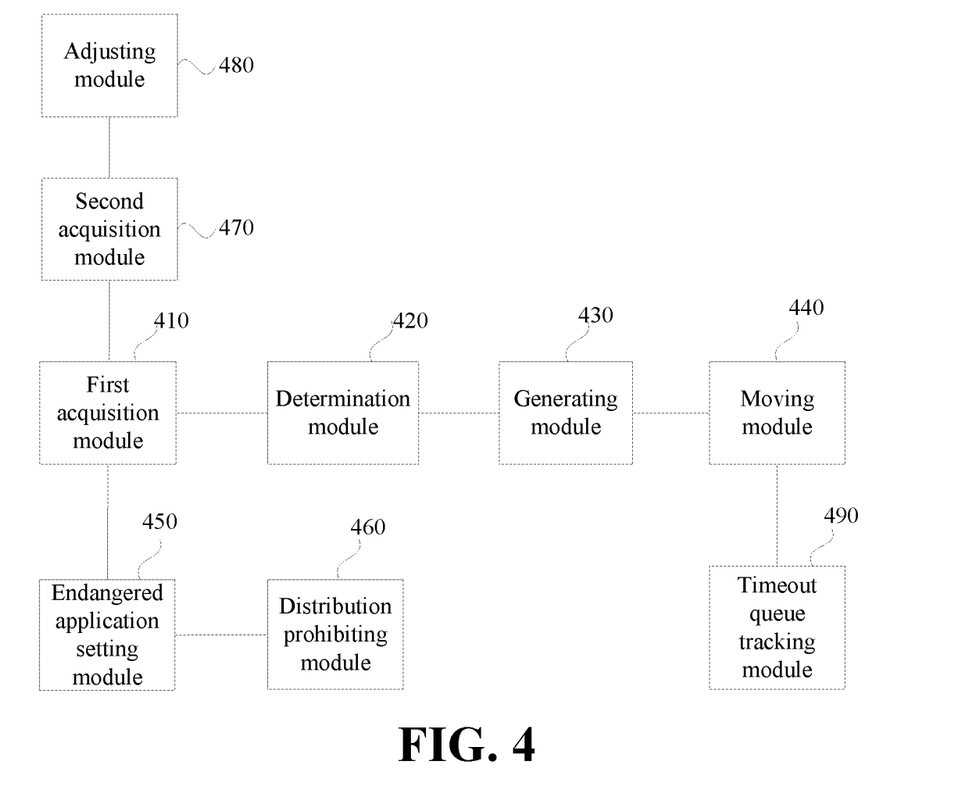
FIG. 4 is a structural diagram of an apparatus provided by an embodiment of the present disclosure to adjust broadcast receiver queue.

When there are more than one first target broadcast receivers, and a target broadcast message is received, a timeout queue tracking module 490 may be used to detect in sequence whether each of the first broadcast receivers may complete processing the target broadcast message within a third predefined range.

When the first target broadcast receiver is detected to complete processing the target broadcast message within the third predefined range, the target broadcast message may be distributed to a next first broadcast receiver.

In another embodiment, a broadcast receiver queue adjusting apparatus may be provided to execute the method for adjusting the broadcast receiver queue as shown in FIG. 4. The apparatus may include a first acquisition module 410, a determination module 420, a generating module 430, and a moving module 440.

The first acquisition module 410 may be used to acquire a historical parameter of any broadcast receiver, wherein the broadcast receiver may be arranged in a first broadcast receiver queue.

The determination module 420 may be used to determine whether the historical parameter meets a first predefined condition.

The generating module 430 may be used to generate a second broadcast receiver queue, when the historical parameter of a first target broadcast receiver in the first broadcast receiver queue.

The moving module 440 may be used to move the first target broadcast receiver to a second broadcast receiver queue, so that broadcast receivers other than the first target broadcast receiver in the first broadcast receiver queue and the first target broadcast receiver in the second broadcast receiver queue may process broadcast messages in parallel. In such a way, the second broadcast receiver queue may consist of broadcast receivers, which are initially arranged in the first broadcast receiver queue, and the historical parameter of which meet the first predefined condition.

Further, the historical parameter may include a number of historical timeouts for processing broadcast messages.

The determination module 420 may be used to determine whether the number of historical timeouts for processing broadcast messages reaches a first set threshold value.

The generating module 430 may be used to generate the second broadcast receiver queue, when the number of historical timeouts for the first target broadcast receiver in the first broadcast receiver queue to process broadcast messages reaches the first set threshold value.

Further, when time that a broadcast receiver consumes to process a broadcast message is greater than a set fixed time threshold value, the number of historical timeouts may increase by one.

Alternatively, when the time that the broadcast receiver consumes to process the broadcast message is greater than a dynamic time threshold value, the number of historical timeouts may increase by one. The dynamic time threshold value may be determined based on an initially set value, the number of historical timeouts, and time increasing amplitude. The time increasing amplitude may be an increased amount of the dynamic time threshold value for each increase of the number of timeouts over a predetermined number.

Further, the historical parameter may include the dynamic time threshold value, which is used to determine whether broadcast message is time-out processed.

The determination module 420 may be used to determine whether the dynamic time threshold value, which may be used to determine whether broadcast message is time-out processed, is for the first time being greater than a second set threshold value.

The generating module 430 may be used to generate the second broadcast receiver queue, when the dynamic time threshold value, which may be used to determine whether broadcast message is time-out processed, corresponding to the first target broadcast receiver in the first broadcast receiver queue is for the first time being greater than the second set threshold value.

The dynamic time threshold value may be determined based on the acquired the number of historical timeouts, time increasing amplitude, and an initially set value. The initially set value may be smaller than the second set threshold value, and the second set threshold value may be fixed.

Further, the apparatus may include following modules.

An endangered application setting module 450 may be used to set a first target broadcast receiver to be a second target broadcast receiver, which is an endangered application, when a historical parameter of the first target broadcast receiver meets a second predefined condition.

A distribution prohibiting module 460 may be used to prohibit distribution of broadcast messages to the second target broadcast receiver.

The historical parameter may include a number of historical timeouts for processing broadcast messages, historical time consumed to process broadcast messages, a sum of duration of historical timeouts for processing broadcast messages, or the dynamic time threshold value for determining whether broadcast message is time-out processed. The dynamic time threshold value may be determined based on the number of historical timeouts, time increasing amplitude, and an initially set value.

Further, for the historical parameter including the number of historical timeouts for processing broadcast messages, the apparatus may include following modules.

A second acquisition module 470 may be used to acquire the sum of duration of historical timeouts for the broadcast receiver to process broadcast messages.

An adjusting module 480 may be used to adjust a sequence of broadcast receivers, which may have the same number of historical timeouts, based on the sum of duration of historical timeouts.

Further, the apparatus may include a following module.

When more than one first target broadcast receivers are available, and when a target broadcast message is received, a timeout queue tracking module 490 may be used to detect the first broadcast receivers in sequence whether each of which completes processing a target broadcast message within a third predefined range.

When a first target broadcast received is detected as completing processing the target broadcast message within the third predefined range, the target broadcast message may be distributed to a next first target broadcast receiver.

The broadcast receiver queue adjusting apparatus provided by the present embodiment may move the first target broadcast receiver, which has the historical parameter meeting the first predefined condition, from the first broadcast receiver queue to the generated second broadcast receiver queue. In such a way, broadcast receivers other than the first target broadcast receiver in the first broadcast receiver queue and the first target broadcast receiver in the second broadcast receiver queue may process broadcast messages in parallel. Speed of processing broadcast messages may be improved, the number of timeouts may be reduced, and the system may be stabilized.

The present disclosure may further provide an electronic device, including a processor and a non-transitory memory. The non-transitory memory may store a plurality of instruction, and the processor may load the instructions that stored in the non-transitory memory to execute following operations.

A historical parameter of any broadcast receiver may be acquired, wherein the broadcast receiver may be initially arranged in a first broadcast receiver queue.

It may be determined whether the historical parameter meets a first predefined condition.

When the historical parameter of a first target broadcast receiver in the first broadcast receiver queue meets the first predefined condition, a second broadcast receiver queue may be generated.

The first target broadcast receiver may be moved to the second broadcast receiver queue, such that broadcast receivers other than the first target broadcast receiver in the first broadcast receiver queue and the first broadcast receiver in the second broadcast receiver queue may process broadcast messages in parallel. In such a way, the second broadcast receiver queue may consist of broadcast receivers, which are initially arranged in the first broadcast receiver queue, and the historical parameter of which meets the first predefined condition.

Figure 5:
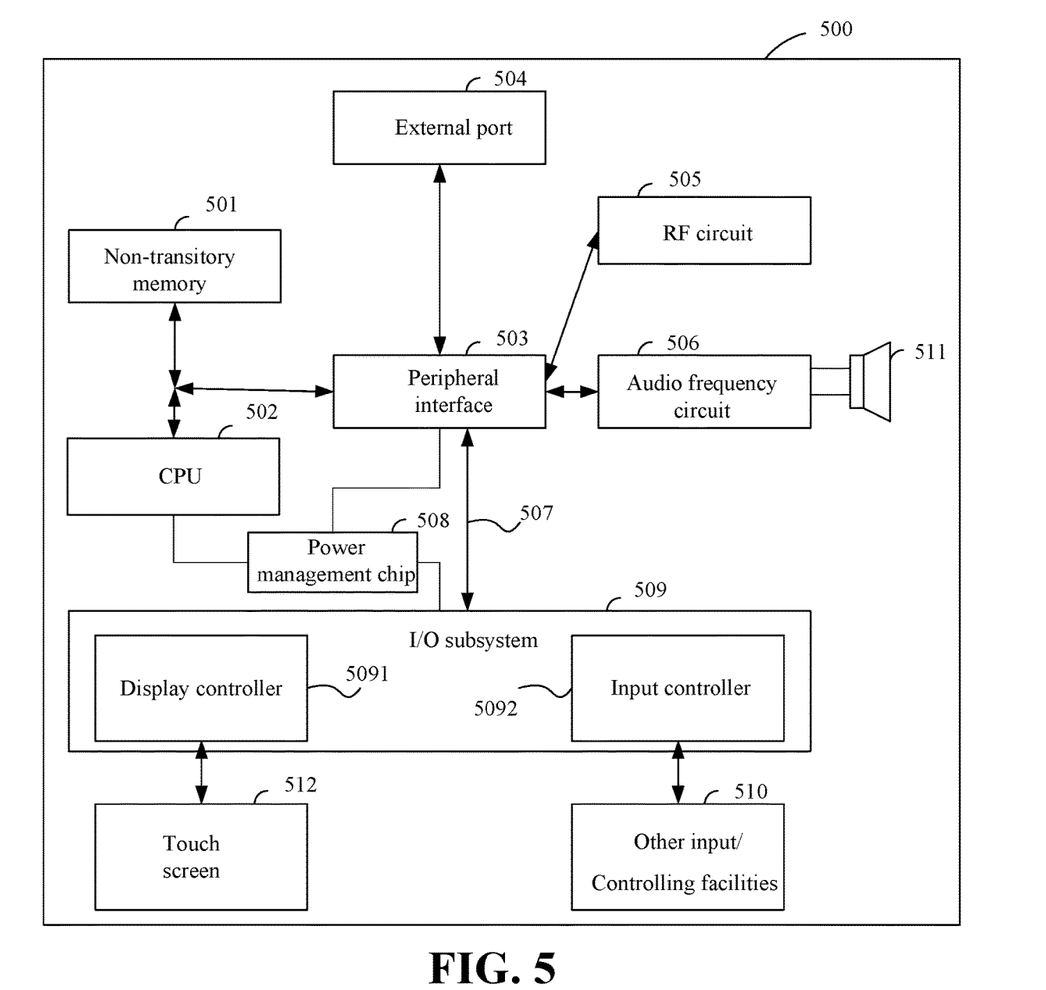
FIG. 5 is a structural diagram of an electronic device provided by an embodiment of the present disclosure.

Another embodiment may provide an electronic device, which may be a smart phone, a tablet computer or the like. The electronic device may integrate the broadcast receiver queue adjusting apparatus provide by an embodiment of the present disclosure. As shown in FIG. 5, the electronic device 500 may include: a non-transitory memory 501, a central processing unit (CPU) 502 (which may also be called as a processor, and hereinafter referred to as a CPU), a touch screen 512, and computer programs, which may be stored in the non-transitory memory and operated by the CPU. The touch screen 512 may be used to transmit user operations to electric signals input into the CPU and display visual output signals. The CPU 502 may execute implement following operations while executing the computer programs.

In a normal broadcast receiver queue, historical time that a broadcast receiver consumes to process broadcast message may be acquired; a historical parameter of the broadcast receiver may be acquired; it may be determined whether the historical parameter meets a first predefined condition; when the historical parameter of a first target broadcast receiver in a first broadcast receiver queue meets the first predefined condition, a second broadcast receiver queue may be generated; the first target broadcast receiver may be moved to the second broadcast receiver queue, such that broadcast receivers other than the first target broadcast receiver in the first broadcast receiver queue and the first target broadcast receiver in the second broadcast receiver queue may process broadcast messages in parallel.

The electronic device 500 may further include: a peripheral interface 503, a radio frequency (RF) circuit 505, an audio circuit 506, a loud speaker 511, a power management chip 508, an input/output (I/O) subsystem 509, other I/O facilities 510 and an external port 504. These components may communicate through one or more of communication buses or through a signal line 507.

It should be understood that, the electronic device 500 shown in the figure is only an example of a terminal, the electronic device 500 may include more or less components than what are shown in the figure. Two or more of the components may be combined, or the electronic device may have different configuration of components. Various components shown in the figure may be achieved in forms of hardware, software, or a combination of the hardware and the software, wherein the hardware and the software may include one or more of signal processing and/or application-specific integrated circuits.

The following embodiment may provide an electronic device having a broadcast receiver queue adjusting apparatus integrated, which will be described in details. A mobile phone will be used as an example of the electronic device.

A non-transitory memory 501 may be accessed by a CPU 502, a peripheral interface 503, and the like. The non-transitory memory 501 may include a high-speed random access memory or a nonvolatile memory, for example one or more of disk storage devices, flash memory devices, or other volatile solid state memory devices.

The peripheral interface 503 may externally connect inputs and outputs of the device to the CPU 502 and the non-transitory memory 501.

The I/O subsystem 509 may transmit inputs and outputs of the device to the peripheral. For example, the touch screen 512 and other input/controlling facilities 510 may be connected to the peripheral interface 503. I/O subsystem 509 may include a display controller 5091 and one or more of controllers 5092, which may be used to control the other input/controlling facilities 510. The one or more of the controllers 5092 may receive electric signals from other input/controlling facilities 510 or send electric signals to other input/controlling facilities 510. The other input/controlling facilities 510 may include physical buttons (a pressing button, a rocker button, and the like), dials, slide switches, joysticks, and click wheels. To be noted that, the input controller 5092 may connect to any one of the following: a keyboard, an infrared port, a USB interface, and a pointing device such as a mouse.

The touch screen 512 may be an interface for input and output between the user terminal the user. Visual output may be displayed to the user, wherein the visual output may include graphs, texts, icons, videos and the like.

The display controller 5091 in the I/O subsystem 509 may receive electric signals from the touch screen 512 or send electric signals to the touch screen 512. The touch screen 512 may detect touches on the touch screen, and the display controller 5091 may transmit the detected touches into an interaction with a user interface object, displayed on the touch screen 512, such that a human-device interaction may be achieved. The user interface object displayed on the touch screen 512 may be an icon to operate a game, an icon to connect to a network, and the like. To be noted that, the device may further include an optical mouse, wherein the optical mouse may be a touch-sensitive surface without displaying visual outputs or an extension of a touch-sensitive surface formed from the touch screen.

The RF circuit 505 may be mainly used to generate communication between the mobile phone and a wireless network (that is a network side), such that data receipt and sending may be performed between the mobile phone and the wireless network, such as receiving and sending messages, emails, and the like. To be specific, the RF circuit 505 may receive and send RF signals, which are also called electromagnetic signals. The RF circuit 505 may transmit the electric signals into the electromagnetic signals or transmit the electromagnetic signals into the electric signals, and communicate with communicational networks other devices through the electromagnetic signals. The RF circuit 505 may include a known circuit, which may be used to execute the above-mentioned functions, including but not limited to an antenna system, an RF transceiver, one or more amplifiers, a network coordinator, one or more oscillators, a digital signal processor, a coder-decoder (CODEC), a chipset, a subscriber identity module (SIM), and the like.

The audio frequency circuit 506 may be used to receive audio data from the peripheral interface 503, transmit the audio data into electric signals, and send the electric signals to the loud speaker 511.

The loudspeaker 511 may be used for the mobile phone to receive voice signals from the wireless network through the RF circuit 505, the voice signals may be restored into voice to be played to the user.

The power management chip 508 may be used to supply power to and manage power of hardware, which is connected to the CPU 502, I/O subsystem, and the peripheral interface.

The electronic device provided by the present embodiment may be used to implement the method for adjusting the broadcast receiver queue as described above. Technical principles and generated technical effects may be similar, which will not be described repeatedly herein.

To be noted that, the above description is only about embodiments of the present disclosure and implemented technical principles. Skilled in the art should understand that the present disclosure should not be limited to the specific embodiments described herein. Skilled in the art shall be able to perform any obvious modifications, re-adjustment and replacement to the embodiments without departing from the scope of the present disclosure. Therefore, although the present disclosure may be described in details through the above-mentioned embodiments, the present disclosure should not be limited to the above-mentioned embodiments. Without departing from the concepts of the present disclosure, may other equivalent embodiment may also be included, and the scope of the present disclosure is defined by the claims.

What is claimed is:

1. A method for adjusting a broadcast receiver queue, applied in an electronic device, comprising:
    acquiring a historical parameter of any broadcast receiver, wherein the broadcast receiver is arranged in a first broadcast receiver queue;
    determining whether the historical parameter meets a first predefined condition;
    generating a second broadcast receiver queue, when the historical parameter of a first target broadcast receiver in the first broadcast receiver queue meets the first predefined condition; and
    moving the first target broadcast receiver to the second broadcast receiver queue, such that other broadcast receivers rather than the first target broadcast receiver in the first target broadcast receiver queue and the first target broadcast receiver in the second broadcast receiver queue process broadcast messages in parallel, and the second broadcast queue consists of only broadcast receivers, which are initially arranged in the first broadcast queue, and each of the broadcast receivers in the second broadcast queue has the historical parameter meeting the first predefined condition, wherein the historical parameter comprises a dynamic time threshold value, which is used to determine whether the broadcast messages are time-out processed;
    wherein determining whether the historical parameter meets the first predefined condition comprises:
        determining whether the dynamic time threshold value, which is used to determine whether the broadcast messages are time-out processed, is greater than a set threshold value for the first time;

wherein generating the second broadcast receiver queue, when the historical parameter of the first target broadcast receiver in the first broadcast receiver queue meets the first predefined condition, comprises:
 generating the second broadcast receiver queue, when the corresponding dynamic time threshold value of the first target broadcast receiver in the first broadcast receiver queue is greater than the set threshold value for the first time;
wherein the dynamic time threshold value is determined based on the number of the historical timeouts, a time increasing amplitude, and an initially set value,
wherein the initially set value is smaller than the set threshold value,
wherein the set threshold value is a fixed value,
wherein when a time that one of the broadcast receivers, which includes the first target broadcast receiver, consumes to process one of the broadcast messages is greater than the dynamic time threshold value, the number of the historical timeouts is increased by one, and
wherein the time increasing amplitude is an increased amount of the dynamic time threshold value for each increase of the number of timeouts over a predetermined number.

2. The method according to claim 1, further comprising:
setting the first target broadcast receiver to be a second target broadcast receiver, when the historical parameter of the first target broadcast receiver further meets a second predefined condition;
prohibiting from distributing the broadcast messages to the second target broadcast receiver.

3. The method according to claim 1, wherein the historical parameter comprises a number of historical timeouts for processing broadcast messages, and the method further comprises:
acquiring a sum of duration of historical timeouts for one of the broadcast receivers, which includes the first target broadcast receiver, to process the broadcast messages; and
adjusting a sequence of any broadcast receivers that have a same number of historical timeouts based on the acquired sum of duration of historical timeouts.

4. The method according to claim 1, further comprising:
when more than one first target broadcast receivers being available, and receiving a target broadcast message, detecting in sequence whether each of the first target broadcast receivers completes processing the target broadcast message within a third set threshold value;
when a present first target broadcast receiver is detected as not completing processing the target broadcast message within the third set threshold value, distributing the target broadcast message to a next first target broadcast receiver, and labeling the next first target broadcast receiver as the present first target broadcast receiver.

5. A non-transitory storage medium, for storing a plurality of instructions which are able to be executed by a processor for causing the processor to perform a method to adjust a broadcast receiver queue, wherein the method comprises:
acquiring a historical parameter of any broadcast receiver, wherein the broadcast receiver is arranged in a first broadcast receiver queue;
determining whether the historical parameter meets a first predefined condition;
generating a second broadcast receiver queue when the historical parameter of a first target broadcast receiver in the first broadcast receiver queue meets the first predefined condition; and
moving the first target broadcast receiver to the second broadcast receiver queue, such that other broadcast receivers rather than the first target broadcast receiver in the first broadcast receiver queue and the first target broadcast receiver in the second broadcast receiver queue process broadcast messages in parallel, and the second broadcast queue consists of only broadcast receivers, which are initially arranged in the first broadcast queue, and each of the broadcast receivers in the second broadcast queue has the historical parameter meeting the first predefined condition, wherein the historical parameter comprises a dynamic time threshold value, which is used to determine whether the broadcast messages are time-out processed;
wherein determining whether the historical parameter meets the first predefined condition comprises:
 determining whether the dynamic time threshold value, which is used to determine whether broadcast messages is time-out processed, is greater than a set threshold value for the first time;
wherein generating the second broadcast receiver queue, when the historical parameter of the first target broadcast receiver in the first broadcast receiver queue meets the first predefined condition, comprises:
 generating the second broadcast receiver queue, when the corresponding dynamic time threshold value of the first target broadcast receiver in the first broadcast receiver queue is greater than the set threshold value for the first time;
wherein the dynamic time threshold value is determined based on the number of the historical timeouts, a time increasing amplitude, and an initially set value,
wherein the initially set value is smaller than the set threshold value,
wherein the set threshold value is a fixed value,
wherein when a time that one of the broadcast receivers, which includes the first target broadcast receiver, consumes to process one of the broadcast messages is greater than the dynamic time threshold value, the number of the historical timeouts is increased by one, and
wherein the time increasing amplitude is an increased amount of the dynamic time threshold value for each increase of the number of timeouts over a predetermined number.

6. The non-transitory storage medium according to claim 5, wherein
when the historical parameter of the first broadcast receiver further meets a second predefined condition, the instructions are executed to
set the first target broadcast receiver to be a second target broadcast receiver; and
prohibit from distributing the broadcast messages to the second target broadcast receiver.

7. The non-transitory storage medium according to claim 5, wherein
the historical parameter comprises a number of historical timeouts for processing the broadcast messages, and a sum of duration of historical timeouts for one of the broadcast receivers, which includes the first target broadcast receiver, to process the broadcast messages; and the instructions are executed to adjust a sequence of any broadcast receivers that have a same number of historical timeouts based on the acquired sum of duration of historical timeouts.

8. The non-transitory storage medium according to claim 7, wherein
the instructions are further executed to sequence the broadcast receivers that have the same number of historical timeouts based on the acquired sum of duration of historical timeouts from the smallest to the greatest, such that a broadcast receiver that has a smaller sum of duration of timeout, process a next broadcast message first.

9. The non-transitory storage medium according to claim 5, wherein
when more than one first target broadcast receivers being available, and receiving a target broadcast message, the instructions are executed to detect in sequence whether each of the first target broadcast receivers completes processing the target broadcast message within a third set threshold value; and
when a present first target broadcast receiver is detected as not completing processing the target broadcast message within the third set threshold value, the instructions are executed to distribute the target broadcast message to a next first target broadcast receiver, and labeling the next first target broadcast receiver as the present first target broadcast receiver.

10. An electronic device, comprising a processor and a non-transitory memory, wherein the non-transitory memory stores a plurality of instructions and the instructions stored in the non-transitory memory are loaded by the processor to:
acquire a historical parameter of any broadcast receiver, wherein the broadcast receiver is arranged in a first broadcast receiver queue;
determine whether the historical parameter meets a first predefined condition;
generate a second broadcast receiver queue, when the historical parameter of a first target broadcast receiver in the first broadcast receiver queue meets the first predefined condition; and
move the first target broadcast receiver to the second broadcast receiver queue, such that other broadcast receivers rather than the first target broadcast receiver in the first broadcast receiver queue and the first target broadcast receiver in the second broadcast receiver queue process broadcast messages in parallel, and the second broadcast queue consists of only broadcast receivers, which are initially arranged in the first broadcast queue, and each of the broadcast receivers in the second broadcast queue has the historical parameter meeting the first predefined condition, wherein the historical parameter comprises a dynamic time threshold value, which is used to determine whether the broadcast messages are time-out processed;
wherein determining whether the historical parameter meets the first predefined condition comprises:
determining whether the dynamic time threshold value, which is used to determine whether broadcast messages is time-out processed, is greater than a set threshold value for the first time;
wherein generating the second broadcast receiver queue, when the historical parameter of the first target broadcast receiver in the first broadcast receiver queue meets the first predefined condition, comprises:
generating the second broadcast receiver queue, when the corresponding dynamic time threshold value of the first target broadcast receiver in the first broadcast receiver queue is greater than the set threshold value for the first time;
wherein the dynamic time threshold value is determined based on the number of the historical timeouts, a time increasing amplitude, and an initially set value,
wherein the initially set value is smaller than the set threshold value,
wherein the set threshold value is a fixed value,
wherein when a time that one of the broadcast receivers, which includes the first target broadcast receiver, consumes to process one of the broadcast messages is greater than the dynamic time threshold value, the number of the historical timeouts is increased by one, and
wherein the time increasing amplitude is an increased amount of the dynamic time threshold value for each increase of the number of timeouts over a predetermined number.

11. The electronic device according to claim 10, wherein the processor is arranged to:
set the first target broadcast receiver to be a second target broadcast receiver, when the historical parameter of the first target broadcast receiver further meets a second predefined condition; and
prohibit from distributing the broadcast messages to the second target broadcast receiver.

12. The electronic device according to claim 10, wherein the historical parameter comprises a number of historical timeouts for processing the broadcast messages, and the processor is further arranged to
acquire a sum of duration of historical timeouts for one of the broadcast receivers, which includes the first target broadcast receiver, to process the broadcast messages; and
adjust a sequence of any broadcast receivers that have a same number of historical timeouts according to the acquired sum of duration of historical timeouts.

13. The electronic device according to claim 10, wherein the processor is further arranged to:
detect in sequence whether each of the first target broadcast receivers completes processing a target broadcast message within a third set threshold value when more than one of the first target broadcast receivers being available, and receiving the target broadcast message; and
when a present first target broadcast receivers is detected as not completing processing the target broadcast message within the third set threshold value, distribute the target broadcast message to a next first target broadcast receiver and label the next first target broadcast receiver as the present first target broadcast receiver.

\* \* \* \* \*